Figure 1:
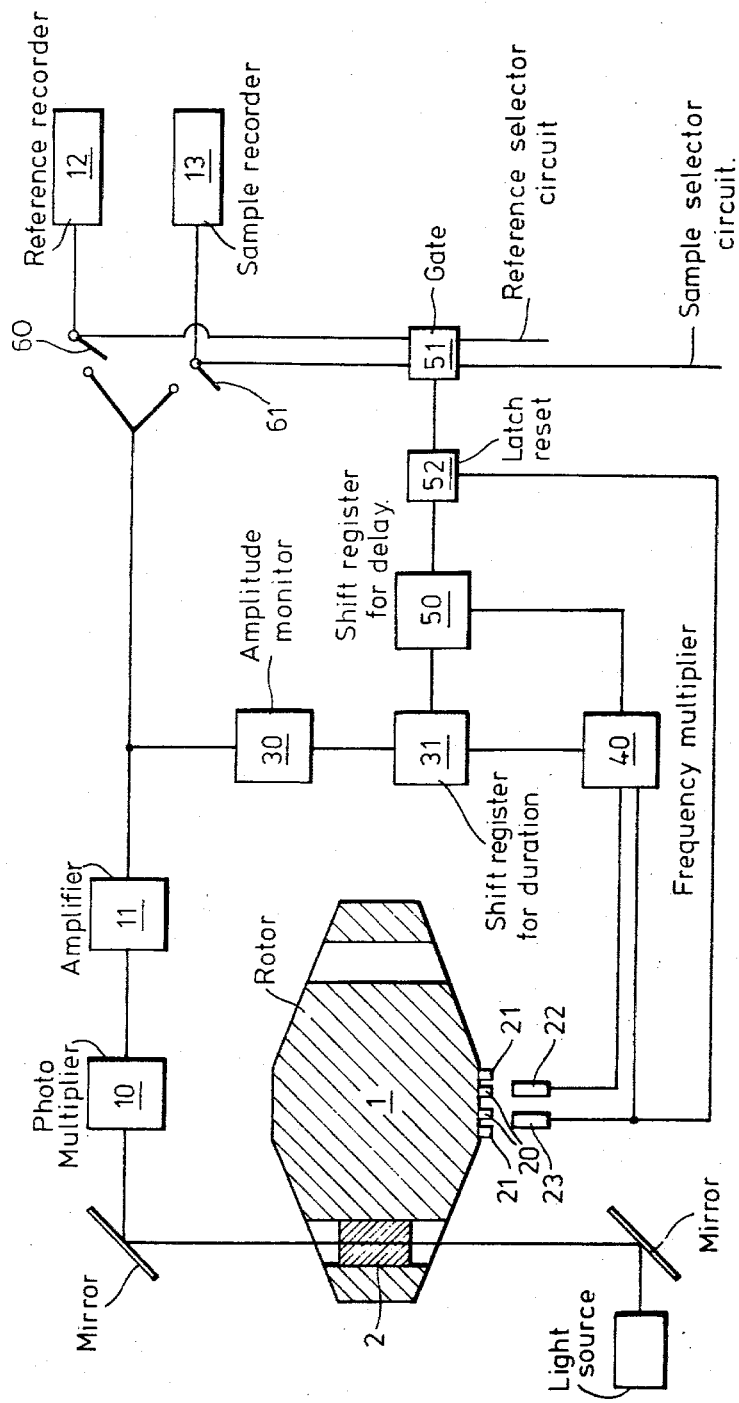

United States Patent [19]

Colley

[11] 4,226,537
[45] Oct. 7, 1980

[54] ANALYTICAL CENTRIFUGE WITH IMPROVED SIGNAL/NOISE RATIO

[75] Inventor: Edward E. S. Colley, Redhill, England

[73] Assignee: Fisons Limited, London, England

[21] Appl. No.: 25,323

[22] Filed: Mar. 30, 1979

[30] Foreign Application Priority Data

Apr. 15, 1978 [GB] United Kingdom ............... 14877/78

[51] Int. Cl.³ .......................................... G01N 21/01
[52] U.S. Cl. .............................. 356/427; 250/237 R; 422/72
[58] Field of Search ............................. 356/426–428, 356/151, 152; 422/72

[56] References Cited

U.S. PATENT DOCUMENTS 3,807,874  4/1974  Gropper .......................... 356/427

Primary Examiner—John K. Corbin
Assistant Examiner—Bruce Arnold
Attorney, Agent, or Firm—Merriam, Marshall & Bicknell

[57] ABSTRACT

Valid signals from a cell in a centrifuge rotor are distinguished from extraneous signals by passing the signals through circuits which compare the amplitude and duration of the signal with the minimum expected values for those signals. Signals having the desired amplitude and duration are passed to the appropriate recorder which can be selected by a switching mechanism actuated by a circuit triggered at the release of the signal from the duration comparison circuit. The duration comparison circuit counts signals emitted from the rotor as it rotates and hence will operate over a wide range of speeds of rotation.

9 Claims, 3 Drawing Figures

ANALYTICAL CENTRIFUGE WITH IMPROVED SIGNAL/NOISE RATIO

The present invention relates to a method, notably a method for distinguishing valid signals from background noise.

In operating an analytical centrifuge it is often desired to measure the refraction of a light beam or other characteristic of a sample held in a cell in the rotor, e.g. using, in the case of refraction, what is known as the Schlieren system. However, inequalities in the construction of the cell itself can cause major discrepancies between readings from individual cells which distort the reading for the samples in those cells. It has therefore been proposed to use split cells in which a single cell is divided by a radial partition into two, usually sector shaped, half cells. One half cell carries the reference sample and the other half cell carries the sample under test.

Whilst the split cell reduces discrepancies due to variations in the cell itself, it introduces complexities in operation. It becomes necessary to switch over from the reference sample recorder to the test sample recorder at a very accurately controlled point in the rotation of the centrifuge. Typically, each half cell extends tangentially over 5 to 10° of the rotor, with only from 1° to 3° between the two halves of each split cell, compared to the 60° or more between each whole cell. This has required complex and expensive electronic control devices. Hitherto, such control systems have required that scanning of the cells be carried out at a given speed of rotation in order that the location of each split cell can be determined on a time elapsed basis following triggering by some mark on the rotor. This limits the speed of operation of the centrifuge to that selected speed. Also, extraneous signals can accidentally trip the mark sensor and render accurate measurement through specified cell halves difficult.

We have now devised a method of operating a centrifuge rotor which reduces the above problems.

Accordingly, the present invention relates to a method for discriminating valid first signals from a sample carried by a component of a centrifuge rotating about an axis thereof, which method comprises generating a second series of signals having a duration proportional to the angular speed of rotation of the component and proportional to the duration of a valid first signal; comparing the amplitude and duration of the first signals with the expected amplitude of a valid first signal and with the duration of a valid signal as expressed by said second series of signals; and rejecting signals which are not of the desired duration and amplitude.

To aid understanding of the invention, it will be described by way of illustration only with respect to operation of an analytical centrifuge using the Schlieren system. Such a centrifuge is illustrated diagrammatically in the accompanying drawings in which FIG. 1 is a diagrammatic section through the centrifuge rotor and shows the cell selection circuitry diagrammatically.

Figure 2:
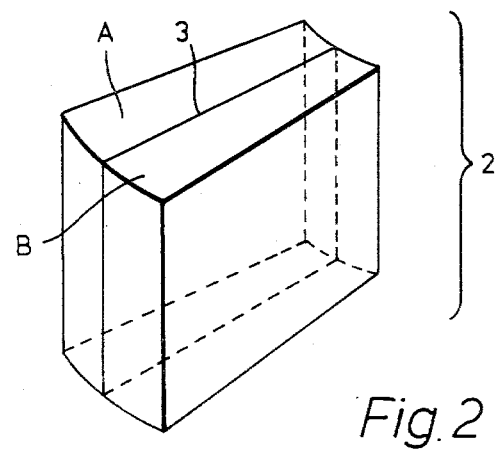
Figure 3:
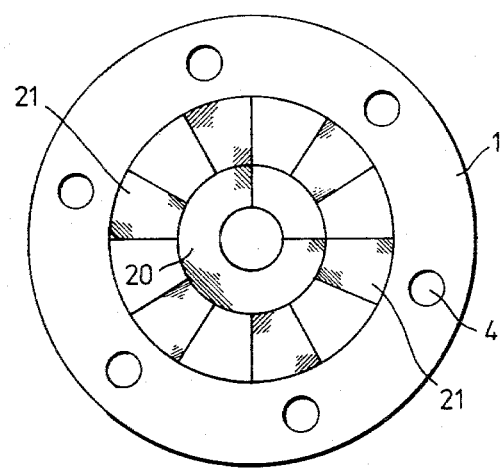

FIG. 2 is a diagrammatic elevational view of a split cell for use in the rotor of FIG. 1; and FIG. 3 is a diagrammatic plan view from below of the rotor of FIG. 1.

The centrifuge comprises a conventional analytical rotor 1 having a series of (in this case 6) split cells 2 arranged in radial symmetry around the rotor. Each split cell, as shown in FIG. 2, comprises a cylindrical, or more preferably a sector shaped cross-section, cell subdivided by a radial wall 3 into two half cells (A and B). Such split cells are commercially available. The cell 2 is held in place in bore 4 through the rotor 1 with its axis substantially parallel, e.g. to within ±10°, to the axis of rotation of rotor 1.

Under rotor 1 is located a light source which shines a beam of light through each cell 2 as the cell passes over it. The diffraction of the light beam is measured in the conventional manner using a suitable photomultiplier 10 and amplifier 11 to give the first series of signals. Recorders 12 and 13 record the signal from each half of the split cells. The signals for each split cell are displayed on a suitable system, e.g. a chart recorder.

A rotating component of the centrifuge carries means for determining the angular orientation and speed of angular rotation of the rotor. The component could be the drive shaft for the rotor or some other rotating part, but is preferably the rotor itself. The rotor carries means for triggering a system for counting a series of markers on the rotor. Typically, the trigger is provided by a physical change on the rotor surface, e.g. a light mark or mirror which is scanned optically, or a magnet or an electrically conductive strip. This trigger is conveniently used to control the speed of the rotor as described below. The rotor also carries a second series of marks which conveniently take the form of a second series of marks of a type similar to the trigger make. A plurality of such seconds marks, preferably at least 4, e.g. 6 to 12, is provided, typically as a track of marks adjacent to the trigger mark and scanned by a separate scanner. Preferably, the second marks are located as a ring of marks substantially concentric with the axis of rotation of the rotor.

It is particularly preferred that (as shown in FIG. 3) the trigger mark be provided as a sector of reflective material, e.g. a 270° arc 20 of polished metal, mounted on the base of the rotor 1 substantially concentric with axis of rotation of the rotor. The second series of marks 21 is preferably an alternating series of 30° arcs of reflective and non-reflective material mounted symmetrically around the periphery of the circle defined by arc 20. Arc 20 and marks 21 are scanned by separate optical scanners 22 and 23 respectively.

The centrifuge assembly is operated as a conventional analytical centrifuge, preferably with the speed of the rotor being controlled by observing the frequency of passage of the trigger mark past scanner 22; or, more preferably, by measuring the duration of the signal from scanner 22. The samples in the cells 2 are scanned in the conventional way using the signals from marks 21 to determine which cell is being scanned, the trigger mark 20 being used to restart the counting-off of the second marks 21 for each revolution of the rotor and thus providing a reference point for the orientation of the rotor for each revolution.

The signals from the cells are fed to photomultiplier 10 and an amplifier 11. However, the output signal from the photomultiplier 10 or its amplifier 11 is not fed direct to the recorders 12 and 13, but is fed to a first circuit 20 where the amplitude of the signal is compared using a comparitor circuit, e.g. a single voltage transistor comparator, against a desired amplitude level. The desired level is set at just below, e.g. 15 to 20% below, the amplitude of the signal which is expected from the sectors of the cell. Ideally, the level is set closer to the expected signal level, but some margin is usually necessary to provide for unexpectedly low readings from the cells. The majority of the background noise signals will be excluded by circuit 30. Provided that the signal exceeds the desired level, it is passed to a second circuit 32 where the angular duration of the signal is compared with the desired angular duration of a valid signal from the cell. Circuit 31 is conveniently a shift register in which the signal from circuit 30 is counted in units of radial duration. The units of radial duration are generated by a frequency multiplier 40 which multiplies the signals from marks 21 to give the second series of signals corresponding to the desired unit of radial duration to be counted. For most purposes, it will be desired to count in ½ to 2° units, since the angular length of each cell or half cell is only 5 to 10° and the blank space corresponding to the wall between the halves of each cell is only 1 to 3°. The signal from circuit 30 is counted through circuit 31 for the duration corresponding to the angular duration of the half cell or cell being scanned as expreesed in the number of signals which marks 21 should emit. If the duration of the signal from the cell satisfies the required count, then the signal from the cell is passed to the appropriate recorder.

The appropriate recorder is selected by a further circuit or shift register 50 which controls the switches 60 and 61 to the recorders. Initially, circuit 50 actuates switch 60 to pass the signal from the cell, regardless of its amplitude and duration, to recorder 70. Once a signal from the cell has been passed through circuits 30 and 31, it passes to circuit 50 to initiate a further count of the second series of signals from the frequency multiplier 40 corresponding to approximately half the angular width of the wall between the half cells. The circuit 50 then actuates an electrical gate or other circuit 51 which opens switch 60 and closes switch 61 to change to recorder 13 for the next half cell. It will usually be required to incorporate a latch reset circuit 52 between circuits 50 and 51 to restore the initial setting of switches 60 and 61 ready for the next cell to be scanned.

The circuits 30, 31, 40, 50, 51 and 52 may take a number of forms and are available commercially or may be readily made using conventional components.

Thus, by providing the amplitude monitoring circuit 30, the shift register 31 and the shift register 50 in a centrifuge assembly to monitor the signals from the photomultiplier, there is provided a system which will discriminate between valid and false signals from a cell and with means for switching the signal from each half cell to its appropriate recorder over a range of speeds of rotation of the centrifuge rotor.

Accordingly, the present invention provides a centrifuge assembly provided with means for determining the speed of angular rotation of the rotor and the angular orientation of the rotor and for measuring a characteristic of a material in a cell carred by the rotor characterised in that it is provided with means for comparing the amplitude and duration of signals generated from a cell being scanned with a desired amplitude and with the angular duration of the cell being scanned and for rejecting signals which are of smaller amplitude and/or shorter angular duration than the signals expected for the cell being scanned. Preferably, the centrifuge is adapted for operation with split cells and the comparison means is adapted to actuate means for separately monitoring the signals from each portion of the split cells.

I claim:

1. A centrifuge assembly provided with means for determining the speed of angular rotation of the rotor and the angular orientation of the rotor and for measuring a characteristic of a material in a cell carried by the rotor characterised in that it is provided with means for comparing the amplitude and duration of signals generated from a cell being scanned with a desired amplitude and with the angular length of the cell being scanned and for rejecting signals which are of smaller amplitude and of shorter angular duration than the signals expected for the cell being scanned.

2. A centrifuge assembly as claimed in claim 1 adapted for operation with split cells and wherein the comparison means is adapted to actuate means for separately recording the signals from each portion of the split cells.

3. A centrifuge assembly as claimed in claim 1 comprising a means for counting signals from the rotor to determine the time taken for the rotor to rotate through the angular duration of the cell whose signal is to be monitored, which means is capable of comparing that duration with the duration of the signal being monitored and of passing that signal to a recording or measurement means only if it is of the desired duration.

4. A centrifuge assembly as claimed in claim 1 wherein the rotor is provided with a series of marks and means for scanning the marks to provide a series of signals corresponding to the speed of angular rotation of the rotor; means for multiplying these signals so as to provide a series of secondary signals each corresponding to an angular rotation which is a submultiple of the angular duration of the portion of the cell whose signal is to be monitored; and counting means for counting the secondary signals up to a total corresponding to the angular duration and for comparing the duration of the observed signal from the cell with that count, the counting means being capable of actuating switch means to pass a signal from the cell having the desired amplitude and duration to a recording or measurement means.

5. A centrifuge as claimed in claim 4 wherein the counting means is a shift register receiving signals from the cell via an amplitude comparison means and from the rotor mark scanning means, which shift register is connected to a second shift register adapted to switch the signal from the cell to a second recording or measurement means upon termination of the signal from the first portion of a split cell.

6. A method for discriminating valid first signals from a sample carried by a component of a centrifuge rotating about an axis thereof, which method comprises generating a second series of signals having a duration proportional to the angular speed of rotation of the component and proportional to the duration of a valid first signal; comparing the amplitude and duration of the first signals with the expected amplitude of a valid first signal and with the duration of a valid signal as expressed by said second series of signals; and rejecting signals which are not of the desired duration and amplitude.

7. A method as claimed in claim 6 wherein the component is the rotor of the centrifuge.

8. A method as claimed in claim 6 wherein the centrifuge rotor carries two series of marks which are independently scanned by separate scanners, the first series of marks serving to trigger the scanning of the second series of marks at a given orientation of the rotor, the signals from the second series of marks providing said second series of signals and being passed to a counter mechanism which is adapted to count the number of said second signals corresponding to the angular duration of a valid first signal and which also counts the first signals for the same duration and which passes said first signals only if they satisy the count.

9. A method as claimed in claim 6 wherein the first series of signals are generated by the diffraction of a light beam passing through a cell carried by the rotor.

* * * * *